Oct. 23, 1962     N. J. DENIL ET AL     3,059,499
FLEXIBLE FLYWHEEL
Filed March 31, 1960
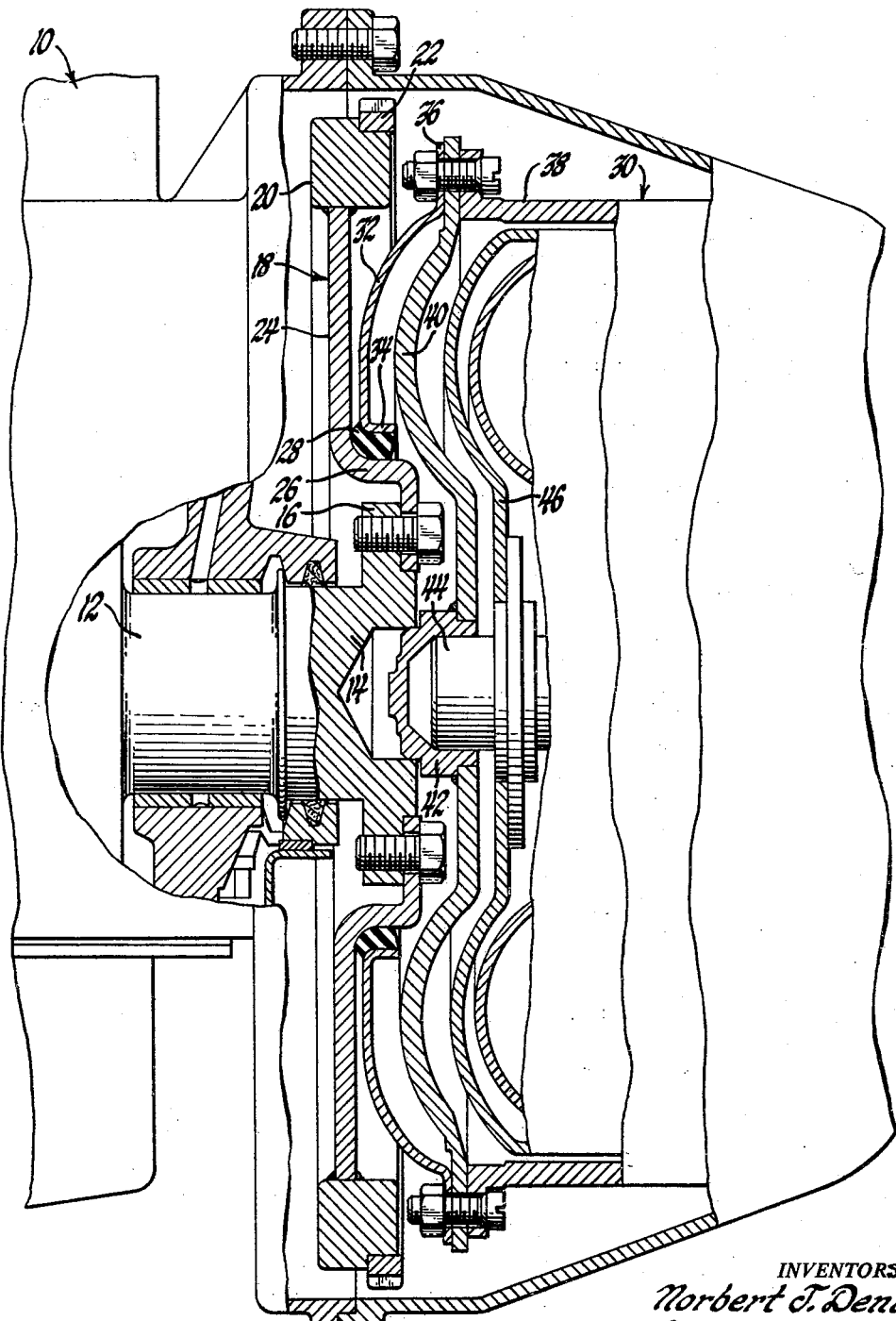
INVENTORS
Norbert J. Denil &
BY Robert W. Burton
D. D. McGraw
ATTORNEY

3,059,499
FLEXIBLE FLYWHEEL
Norbert J. Denil, Dearborn, and Robert W. Burton, Farmington, Mich., assignors to General Motors Corporation, Detroit, Mich., a corporation of Delaware
Filed Mar. 31, 1960, Ser. No. 18,969
2 Claims. (Cl. 74—574)

The invention relates to flywheels used with internal combustion engines in the drive lines of automotive vehicles and particularly to flywheels having one section directly attached to the engine and another section attached to the first section through a soft torsional spring formed of rubber or other suitable plastic material. The second flywheel section may include portions of a transmission of the fluid coupling or torque converter types.

The torque output of an internal combustion engine of the type usually employed in automotive vehicles is composed of the combined forces exerted on each of the engine pistons. These forces are exerted as pulses on the engine crankshaft and rotate the crankshaft. An oscillatory torque imposed on the crankshaft results from this construction. It is common practice to provide a flywheel mounted on the end of the engine crankshaft which acts as an inertia element to smooth out the periodic torque fluctuations. The flywheel has sufficient inertia to produce an inertia torque opposing the oscillatory engine torque, thereby transmitting a more constant torque to the drive line of the vehicle.

The flywheel construction embodying the invention employs two flywheel sections of combined weight and inertia which are substantially less than that required for a single flywheel to reduce the engine oscillatory torque to an acceptable level but substantially eliminates the transmission of engine-induced torsional vibrations to a vehicle drive line.

In the drawing:

The FIGURE shows a partial section of the rear end of an internal combustion engine and the forward end of a fluid power transmission having a flywheel embodying the invention. Parts of the structure are illustrated as being broken away and in section.

The internal combustion engine 10 may be of any suitable type commonly used in automotive vehicles and includes several pistons connected to the engine crankshaft 12 to drive the crankshaft in a rotational direction and provide power for the vehicle. The rear end 14 of crankshaft 12 is provided with a flange 16 to which is bolted or otherwise secured a flywheel section 18. This flywheel section is constructed as an annular disk with an inertia ring 20 on the outer periphery of the disk and a starter ring gear 22 mounted on the outer periphery of the ring 20. Flywheel section 18 has sufficient inertia to provide a smooth engine idle and an acceptable level of excitation for the various engine components and accessories. However, it does not have sufficient inertia to overcome the crankshaft oscillatory torques when the engine is running at speeds higher than idle.

The disk portion 24 of flywheel section 18 is provided with an axially offset shoulder section 26 to which a soft torsional spring 28 is bonded. This spring may be made of a suitable rubber or other plastic material having the desirable torsional characteristics as well as sufficient strength to transmit the engine torques to the input side of the transmission 30. A transmission drive member 32 is illustrated as being an annular dished member with the dished flare extending outwardly and rearwardly so as to clear the inertia ring 20 of flywheel section 18. A flange 34 is provided on the inner periphery of member 32 and is bonded to the outer peripheral surface of torsional spring 28. The outer periphery 36 of member 32 is bolted or otherwise suitably secured to the transmission input member 38. This member may be the torus cover of a fluid power transmission. It may also include the pump portion of the fluid power transmission, if desired.

A second flywheel section 40 is secured to the transmission drive member 32 and the transmission input member 38 at its outer periphery. Flywheel section 40 is formed as a disk and may also function as a portion of the torus cover for the fluid power transmission 30. The central portion 42 of the section 40 may be piloted within the rear end of crankshaft 12 if desired and may also provide a pilot for shaft 44 on which a portion of the fluid power transmission 30 is mounted. For example, a fluid coupling drive element 46 may be secured to the shaft 44. Details of construction of the fluid power transmission form no part of the invention and therefore are not further illustrated and described. It is sufficient to describe the employment of the invention with a portion of the transmission drive without considering the particular type of transmission to be used.

When the engine 10 is operating under idle conditions it is driving various engine components such as the generator, fuel pump, oil pump, water pump, distributor and camshaft, and the accessories which may be installed. Such accessories may include a pump for power steering, an air conditioning compressor, etc. The oscillatory torques imposed on the crankshaft are satisfactorily opposed by the inertia of the flywheel section 18 and most of the oscillatory torques not damped out are not passed to the drive member 32 since the torsional spring 28 is sufficiently soft to prevent their transmission. The spring 28 may be torsionally deflected through substantial arcuate distances during this portion of engine operation. The second flywheel section 40, together with the transmission input member 38 and the drive member 32, provide sufficient inertia to have very small angles of oscillation from any torque vibrations which pass through spring 28. The excitation and oscillatory torques transmitted to the remainder of the drive line is therefore much reduced in amplitude. When the drive line resonant frequencies are encountered the torsional amplitudes produced throughout the system are therefore sufficiently reduced to provide satisfactory operation.

What is claimed is:

1. In an internal combustion engine having a rotatable crankshaft subjected to oscillatory torques created by reciprocating engine components, a flywheel assembly including a first annular flywheel disk having an axially extending shoulder formed thereon adjacent the inner periphery thereof and an inertia ring secured to the outer periphery thereof and having sufficient inertia only to oppose engine oscillatory torques under engine idle operating conditions, an annular low rate torsional spring having its inner periphery secured to said disk shoulder, an annular transmission drive member having a dished conformation and an axially extending flange formed at the inner periphery thereof, said transmission drive member flange being secured to the outer periphery of said torsional spring and said dished driving member extending rearwardly and outwardly from said first flywheel section shoulder, a second flywheel section comprising a disk having its outer periphery secured to the outer periphery of said transmission drive member and a transmission input member drivingly secured to said last named disk and said transmission drive member, said transmission drive member providing permanent spacing between said first flywheel disk and said second flywheel section, said second flywheel section having sufficient inertia to damp substantially all oscillatory torques transmitted from said engine through said torsional spring whereby a steady state torque is delivered by said transmission input member.

2. In an internal combustion engine having a rotatable crankshaft subjected to oscillatory torques created by reciprocating engine components, a flywheel assembly including a first annular flywheel disk having an axially extending shoulder formed thereon adjacent the inner periphery thereof and an inertia ring secured to the outer periphery thereof and having sufficient inertia only to oppose engine oscillatory torques under engine idle operating conditions, a torsionally soft elastomeric annulus having its inner periphery secured to said disk shoulder, an annular transmission drive member having a dished conformation and an axially extending flange formed at the inner periphery thereof, said transmission drive member flange being secured to the outer periphery of said annulus and said dished driving member extending rearwardly and outwardly from said shoulder, a second flywheel section comprising a disk having its outer periphery secured to the outer periphery of said transmission drive member, and a fluid transmission torus cover drivingly secured during all conditions of engine operation to said last named disk and said transmission drive member, said transmission drive member providing permanent spacing between said first flywheel disk and said second flywheel section, said second flywheel section having sufficient inertia to damp substantially all oscillatory torques transmitted from said engine through said annulus whereby a steady state torque is delivered by said torus cover.

References Cited in the file of this patent

UNITED STATES PATENTS

| | | |
|---|---|---|
| 1,660,020 | Wemp | Feb. 21, 1928 |
| 2,585,382 | Guernsey | Feb. 12, 1952 |
| 2,859,637 | Hagenlocker | Nov. 11, 1958 |